United States Patent [19]

Frost et al.

[11] 4,097,866
[45] Jun. 27, 1978

[54] MULTILEVEL SIDELOBE CANCELLER

[75] Inventors: William F. Frost, Huntington; Raymond J. Masak; Herbert F. Baurle, both of E. Northport; Anthony F. Kowalski, Miller Place, all of N.Y.

[73] Assignee: The United States of America as represented by the Secretary of the Air Force, Washington, D.C.

[21] Appl. No.: 767,254

[22] Filed: Feb. 10, 1977

[51] Int. Cl.² .......................... H04B 1/10; G01S 3/06
[52] U.S. Cl. ..................... 343/100 LE; 343/100 CL; 325/371

[58] Field of Search ....... 343/18 E, 100 CE, 100 LE, 343/853, 854; 325/371

[56] References Cited

U.S. PATENT DOCUMENTS 3,938,154  2/1976  Lewis ............................. 343/100 LE

*Primary Examiner*—Eli Lieberman
*Attorney, Agent, or Firm*—Joseph E. Rusz; George Fine

[57] ABSTRACT

A multilevel sidelobe canceller utilizes power level sensitive processing of the auxiliary array outputs to adaptively spatially filter multiple jamming signals with an additional level of adaptive loops prior to conventional sidelobe cancellation.

2 Claims, 1 Drawing Figure

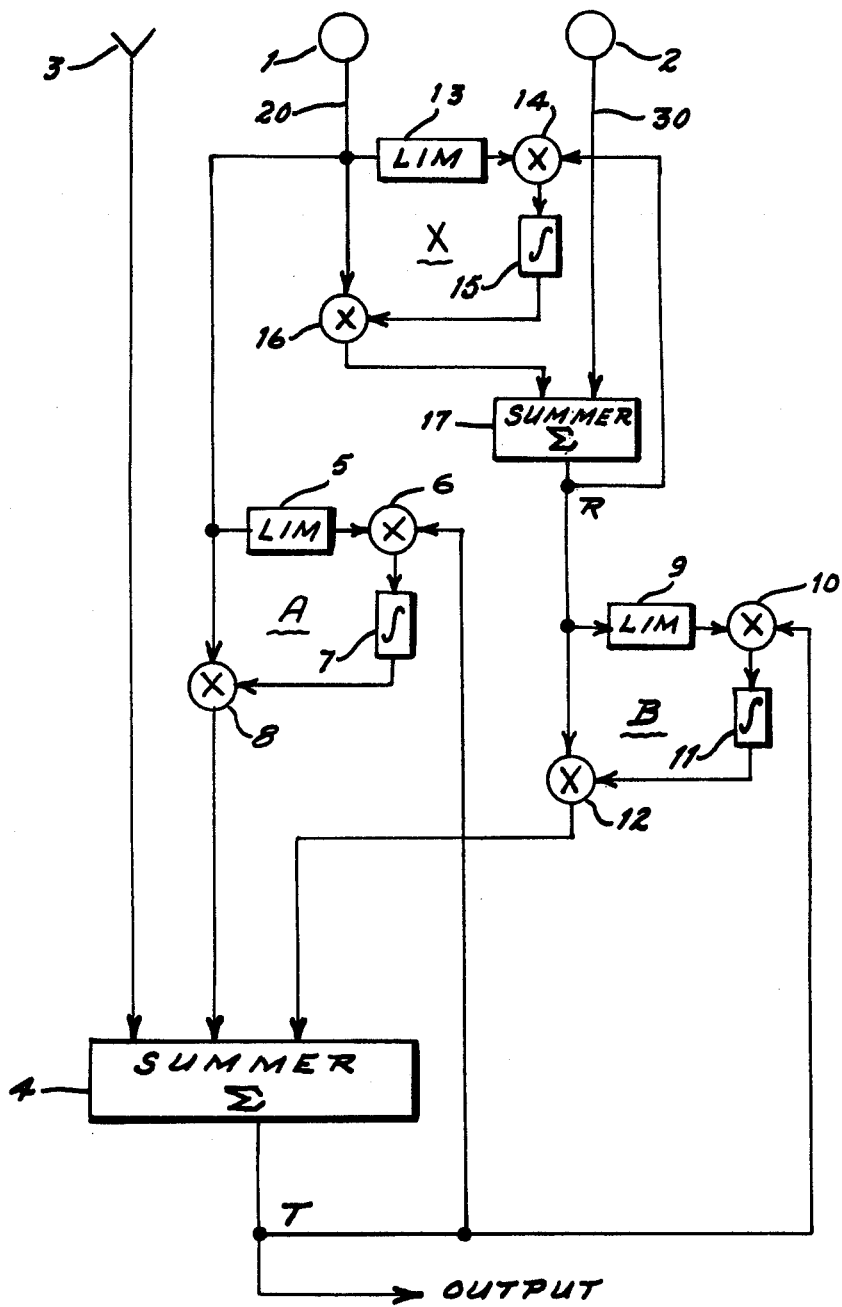

MULTILEVEL SIDELOBE CANCELLER

STATEMENT OF GOVERNMENT INTEREST

The invention described herein may be manufactured and used by or for the Government for governmental purposes without the payment of any royalty thereon.

BACKGROUND OF THE INVENTION

Antenna sidelobe cancellers have in general yielded less than anticipated performance when field tested against multiple jammers. One important factor which contributes to the degradation is the dominance of the strong jammer over the weaker ones in conventional cancellers. This occurs because the strong jammer, in the presence of a weaker one, sets the loop gain requirements. The weaker jammer then has less loop gain and consequently less cancellation.

In accordance with the invention, a solution to this problem is the use of multilevel (power level sensitive) processing to adaptively spatially filter multiple jamming signals from the outputs of the auxiliary array. An additional level of adaptive loops prior to conventional sidelobe cancellation performs the multilevel processing. This additional level of adaptive loop processing can be considered to be a form of precanceller which operates on the jamming signals from a subarray to form nulls in the direction of the stronger jammers, thereby providing sources of signal in which the weaker jammers predominate. Loop gain remains high in the adaptive loops which follow, thereby permitting good cancellation of the originally weaker jammers.

SUMMARY OF THE INVENTION

A multilevel sidelobe canceller is provided utilizing at least two omni-antennas and three adaptive control loops. When only one jammer is present cancellation is achieved by the first loop, which adjusts the phase and amplitude of the jamming signal from the first omni-antenna to cancel the jamming signal in the main channel. The jammer is also received on the second omni-antenna and a second loop adjusts the phase and amplitude of the jamming signal from the first omni-antenna to cancel the jamming signal from the second omni-antenna.

When two jammers of similar magnitude are received by both omni-antennas, the first and second loops operate together to provide cancellation of both jammers. When one jammer is significantly stronger than another, the first adaptive loop adjusts the phase and amplitude of the jamming signal from the first omni-antenna to cancel the strongest jammer. In addition, the combination of the two omni-antennas and the second loop acts as a preprocessor which cancels the strongest jamming signal but yields little performance against the weaker so that the output consists primarily of the weaker jamming signal. The third loop adjusts the phase and amplitude of this jamming signal to cancel the corresponding jamming signal in the main channel. Actually the first and third loops work together to cancel both jamming signals.

DESCRIPTION OF THE DRAWINGS

The single FIGURE shows in block diagram form a typical embodiment of a multilevel sidelobe canceller constructed in accordance with the present invention.

DETAILED DESCRIPTION OF THE EMBODIMENT SHOWN

Now referring to the single FIGURE, there is shown main antenna 3, omni-antenna 1 and omni-antenna 2. The output signal from main antenna 3 is fed to summer 4. There is also shown adaptive loops A, b and X. Loop A is comprised of limiter 5, multiplier 6, integrator 7, and multiplier 8. Loop B is comprised of limiter 9, multiplier 10, integrator 11 and multiplier 12. Loop X is comprised of limiter 13, multiplier 14, integrator 15, and multiplier 16. Summer 17 receives the output from multiplier 16 and from omni-antenna 2, and the output therefrom is fed to multipliers 12 and 14 and also to limiter 9. The output from omni-antenna 1 is fed to limiters 5 and 13 and also to multipliers 8 and 16. It is noted that summer 4 also receives as input signals the outputs from multipliers 8 and 12. The output from summer 4 is also fed back to multipliers 6 and 10.

Three adaptive control loops, labeled A, B and X are shown. When only one jammer is present, cancellation is achieved by first loop A which adjusts the phase and amplitidude of the jamming signal from omni-antenna 1 to cancel the jamming signal in the main channel. The jammer is also received on the second loop labeled X. Adaptive loop X adjusts the phase and amplitude of the jamming signal from omni-antenna 1 to cancel the jamming signal received by omni-antenna 2, resulting in negligible residue at R with the result that loop B is inactive, and the signals from omni-antenna 2 go no further.

When two jammers of similar magnitudes are received by both omni-antennas, cancellation cannot occur with a single loop and both jamming signals appear at R as having an apparent antenna source which is a combination of omni-antenna 1 and omni-antenna 2. Both jamming signals appear at the input to loop B as well as loop A, and the two loops work together to cancel both jamming signals in summer 4. Since they are of comparable amplitude, the loop gains are comparable for each and good cancellation results.

When one jammer is significantly stronger than another, adaptive loop A adjusts the phase and amplitude in auxiliary channel 20 to cancel the strongest jammer. In addition, auxiliary channels 20 and 30 act as a preprocessor using loop X, cancelling the strongest jamming signal but yielding little performance against the weaker. In effect a space null is placed on the strongest jammer. The stronger output of the combined auxiliary channels at R consists primarily of the originally weaker jamming signal and can be considered a virtual beamport for that jammer. Third loop B adjusts the phase and amplitude of this jamming signal for cancellation against the corresponding jamming signal in the main channel.

Actually both loops A and B work together to cancel both jamming signals but the invention makes it possible for loop A to cancel one jammer effectively while loop B copes with the second, even though the jammers may be of different strengths. Those skilled in the art will recognize that the embodiment shown in the drawing may be readily expanded to handle more than two jammers of different strengths.

What is claimed is:

1. A multilevel sidelobe canceller, comprising:
   first, second and third antennas, said second and third antennas having substantially omni-directional reception characteristics;

first, second and third adaptive control loops, each of said loops having a signal input, an output and a feedback input;

first and second summers, the output of said first summer forming the output of said multilevel sidelobe canceller;

means for coupling said first antenna to a first input of said first summer;

means for coupling said second antenna to the signal inputs of said first and second control loops;

means for coupling said third antenna to one input of said second summer;

means for coupling the output of said second control loop to another input of said second summer;

means for coupling the output of said second summer jointly to the signal input of said third control loop and to the feedback input of said second control loop;

means for coupling the output of said first control loop to a second input of said first summer;

means for coupling the output of said third control loop to a third input of said first summer; and means for jointly coupling the output of said first summer to the feedback inputs of said first and third control loops.

2. A multilevel sidelobe canceller being comprised of a main antenna, first and second omni-antennas, first, second and third adaptive control loops, each of the adaptive control loops including a limiter having an input and output, a first multiplier having first and second inputs and an output, a second multiplier having first and second inputs and an output, and an integrator having a first input and an output, said input of said limiter being connected to the first input of said first multiplier, said output of said limiter being connected to said first input of said second multiplier, said output of said second multiplier being connected to said input of said integrator, said output of said integrator being connected to said second input of said first multiplier, said first omni-antenna feeding a signal to the input of said limiters of said first and second adaptive control loops, a first summer receiving an input from said second omni-antenna and an input from the output of said first multiplier of said third adaptive control loop, and a second summer receiving an input from said main antenna, an input from the output of said first multiplier of said first adaptive control loop and an input from the output of said first multiplier of said second adaptive control loop thereby providing an output therefrom, said output also feeding back to said second input of said second multiplier of said first adaptive control loop and also to said second input of said second multiplier of said second adaptive control loop.

* * * * *